United States Patent Office 2,999,099
Patented Sept. 5, 1961

2,999,099
TRINITROETHYLSUCCINIC ACID AND DERIVATIVES THEREOF
Henry Feuer, West Lafayette, Ind., and Emil H. White, Baltimore, Md., assignors to Purdue Research Foundation, Lafayette, Ind., a corporation of Indiana
No Drawing. Filed July 22, 1958, Ser. No. 751,592
6 Claims. (Cl. 260—346.8)

Our invention relates to derivatives of itaconic acid and more particularly it relates to trinitroethylsuccinic acid, derivatives of trinitroethylsuccinic acid and the preparation thereof.

The art discloses that nitroform will add to the carbon-carbon double bonds of crotonaldehyde, acrylic acid, methyl acrylate, and methyl vinyl ketone. For some unexpected reason, however, nitroform will not add to the activated carbon-carbon double bonds of dimethyl maleate, maleic acid, maleic anhydride, fumaric acid, dimethyl fumarate, dimethyl sorbate, diethyl muconate, or dimethyl butynedioate.

Our new compounds are represented by the following structural formula:

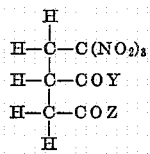

where Y is OH, OR, or X, R being lower alkyl and X being halogen and Z is OH, OR, or X', R being lower alkyl and X' being halogen when X is halogen and where Y and Z together can be the anhydride

Trinitroethylsuccinic acid is prepared by the reaction of itaconic acid and nitroform. Trinitroethylsuccinic anhydride is prepared by the reaction of trinitroethylsuccinic acid with thionyl chloride. Dialkyl trinitroethylsuccinates can be prepared by reacting dialkyl itaconate with nitroform. Lower alkyl trinitroethylsuccinates can be prepared by reacting trinitroethylsuccinic anhydride with an alkyl alcohol such as methanol, ethanol or propanol. Trinitroethylsuccinyl halide can be prepared by reacting trinitroethylsuccinic acid with phosphorus pentahalide.

As mentioned above, the preparation of trinitroethylsuccinic acid involves the reaction of nitroform and itaconic acid. The reaction is between equimolar amounts of the two reactants and is carried out in the presence of an inert solvent since both of the reactants are solid materials. The solvent solution of the reactants is heated, preferably to reflux, until completion of the reaction after which the solvent is removed to obtain trinitroethylsuccinic acid which can be recrystallized from nitromethane or water.

Trinitroethylsuccinic anhydride is prepared by reacting trinitroethylsuccinic acid with thionyl chloride. The two reactants are mixed and heated, preferably to reflux, until completion of the reaction after which excess thionyl chloride is removed to obtain crude anhydride which can be recrystallized from methylene chloride.

The dialkyl trinitroethylsuccinates are prepared in the same manner as described above for the preparation of trinitroethylsuccinic acid except that a lower dialkyl itaconate is employed instead of itaconic acid. Following the reaction the solvent is removed and the residue distilled to obtain the product which is an oily liquid in most instances.

The lower alkyl trinitroethylsuccinates or half esters of trinitroethylsuccinic acid are prepared by reacting trinitroethylsuccinic anhydride with a lower alkyl alcohol. An inert solvent is generally employed, the reactants being mixed, heated, preferably to reflux, until completion of the reaction after which the solvent is removed to obtain the product which is a viscous liquid in most instances.

The halogen derivatives of trinitroethylsuccinic acid can be prepared by mixing the acid and phosphorus pentahalide after which a vigorous reaction sets in causing liquefaction of the mixture. Gentle heating can be applied to bring about complete solution and the material is then cooled and distilled to remove phosphorus oxyhalide after which the remaining trinitroethylsuccinyl halide is crystallized by cooling to room temperature.

Our compounds can be used to form polymers useful as both solid and liquid propellants for reaction motors. These polymers can be fluids or solids, depending on the chain length of the polymers, the nature of the cross-linking agent, etc. These polymers are also stable to shock, heat, etc. to the extent that, as a general rule, additional stabilizers are not required in the propellant mixtures. Our monomers are plasticizers for nitropolymers formed from the said monomers.

As previously indicated, low molecular weight polymers prepared from the monomers of our invention are fluids. These propellants are generally rich in fuel elements and as such can be utilized as a fuel in the process of U.S. Patent 2,537,526 where tetranitromethane and hexanitroethane were used as oxidants and liquid nitroparaffins were used as fuels; in the processes described in U.S. Patents 2,582,048 and 2,548,803 wherein nitrosubstituted aliphatic compounds having more than one nitro group per carbon atom were used as oxidants and nitro-substituted compounds having less than one nitro group per carbon atom were used as fuels in monopropellant systems; or in the similar process of U.S. Patent 2,590,009.

We have found that generally our solid polymers can be dissolved in polar solvents, such as dimethylformamide and lower nitroalkanes, such as tetranitromethane, and, as such, are operative as fuels in the above-described processes. Other solvents which can be used to liquify our polymers include hydrazine, lower alkyl amines, dimethylsulfoxide, Cellosolve, acetonitrile, lower alkanols, nitroesters and nitroethers.

Rubber-like materials can be prepared by interaction of diisocyanates with trinitroethylsuccinic anhydride or acid. Our compounds can also be reacted with polynitro diols and polynitro diamines to produce polynitro polyesters and polynitro polyurea.

Our polymers can be mixed with various oxidant salts, such as ammonium nitrate, ammonium perchlorate, lithium perchlorate, etc. to obtain solid heterogeneous propellants having specific impulses on the order of that of Ballistite.

The following examples are offered to illustrate our invention, however, we do not intend to be limited to the specific proportions, materials, or conditions employed but rather we intend to include within the scope of our invention all equivalents obvious to those skilled in the art.

*Example I*

A solution of 15.1 grams of nitroform and 13.0 grams of itaconic acid in 90 ml. of methyl ethyl ketone was refluxed for six hours and then evaporated to a volume of 15 ml. The resulting crystals were filtered and washed with methylene chloride to obtain 21.2 grams of trinitroethylsuccinic acid which was recrystallized from nitromethane. Melting point 177° C. *Analysis.*—Calculated for $C_6H_7O_{10}N_3$: C=25.62; N=14.94; H=2.49. Found: C=25.90; N=14.72; H=2.34.

Example II

A solution of 7.9 grams of dimethyl itaconate in 50 ml. of methyl ethyl ketone was prepared and 7.4 grams of nitroform slowly added. The mixture was refluxed for six hours. The solvent was removed and the residue distilled at 4 mm. A total of 5.0 grams of dimethyl trinitroethylsuccinate was obtained at 146–150° C. The ester was washed with water and redistilled to yield a straw yellow oil distilling at 137–140° at 3 mm., $n_D^{20}=1.4643$.

Example III

A mixture of 2.81 grams of trinitroethylsuccinic acid and 4.25 grams of phosphorus pentachloride was prepared in a round bottom flask fitted with a reflux condenser and a drying tube. After a few minutes, a vigorous reaction set in causing liquification of the mixture and evolution of hydrogen chloride. Gentle heating was applied for about 4 hours to bring about complete solution and the material was then allowed to cool to 25° C. The reaction product was then transferred to a still consisting of two connected bulbs, 3–4 cm. in diameter joined by 6–7 cm. of 10 mm. tubing bent to an angle of about 5°. The material to be distilled was placed in the end bulb which was immersed in an electrically heated oil bath. The other bulb was cooled in a water stream and the distillate collected in this bulb. For several hours, a vacuum of about 1 mm. was maintained to permit the by-product phosphorus oxychloride to distill into the cold trap and then using an electrically heated oil bath, the system was slowly warmed until a pale yellow liquid distilled at about 110° C. and 0.5 mm. pressure. The product was transferred to a dry, sealed vial and cooled to $-75°$ C. and then allowed to warm to room temperature. A crystalline solid which melted at 41–42° C. after recrystallization from ether was obtained. *Analysis.*—Calculated for $C_6H_5O_8N_3Cl_2$: C=22.66; H=1.59; N=13.21. Found: C=22.57; H=1.80; N=13.5.

Example IV

A 20 gram portion of trinitroethylsuccinic acid was added to 100 ml. of thionyl chloride and the solution refluxed for four hours. The excess thionyl chloride was then removed to obtain crude trinitroethylsuccinic anhydride which was recrystallized from methylene chloride. Melting point 86–89° C. *Analysis.*—Calculated for $C_6H_5O_9N_3$: N=15.95. Found: N=15.90.

Example V

A 5.26 gram portion of trinitroethylsuccinic anhydride was mixed with 0.64 gram of anhydrous methanol and 20 ml. of dry benzene as a diluent. The mixture was heated for 48 hours at 50° C. after which the clear solution was distilled under reduced pressure to remove the benzene. The methyl hydrogen trinitroethylsuccinate obtained was a viscous liquid, $n_D^{20}$ 1.4803. *Analysis.*—Calculated for $C_7H_9N_3O_7$: N=14.22. Found: N=14.04.

The following example is offered to illustrate the use of our new compounds in the production of a polynitro polyester useful as a rocket propellant.

Example VI

A solution of 1.73 grams of trinitroethylsuccinyl chloride and 0.91 gram of 2,2-dinitropropanediol dissolved in 15 ml. of dry methylene chloride was heated to reflux in the presence of 0.15 gram of anhydrous sublimed aluminum chloride. A vigorous reaction took place with the evolution of hydrogen chloride and precipitation of a solid which was removed and dried in vacuum to obtain a polynitro polyester having the following structure:

[—O—$H_2$C—C($NO_2$)$_2$—$CH_2$
—OCOCH($CH_2$—C($NO_2$)$_3$)$CH_2$—CO—]$_n$

Trinitroethylsuccinic acid is insoluble in benzene, chloroform, methylene chloride, and hexane, moderately soluble in water and nitromethane and very soluble in dioxane and acetone.

This application is a continuation-in-part of our U.S. patent application Serial No. 593,009, filed June 14, 1956, and now abandoned.

Now having described our invention what we claim is:

1. The composition having the following structural formula

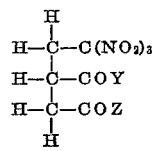

where Y is selected from the group consisting of OH, OR, and X, R is lower alkyl and X is halogen and where Z is selected from the group consisting of OH, OR, and X', R is lower alkyl and X' is halogen when X is halogen and where Y and Z together can form the anhydride.

2. Trinitroethylsuccinic acid.
3. Trinitroethylsuccinyl chloride.
4. Dimethyl trinitroethylsuccinate.
5. Trinitroethylsuccinic anhydride.
6. Methyl hydrogen trinitroethylsuccinate.

References Cited in the file of this patent

FOREIGN PATENTS 698,138    Great Britain _____ Oct. 7, 1953

OTHER REFERENCES

Schultheis: B.I.O.S., H.E.C. 5741, December 1945, declassified June 25, 1948, part I, pp. 6–8.

Hunter: B.I.O.S., Trip No. 1919, Target No. 22/1G, C.I.O.S., Blacklist Item 22, July 3, 1946, pp. 6–9.